Figure 1:
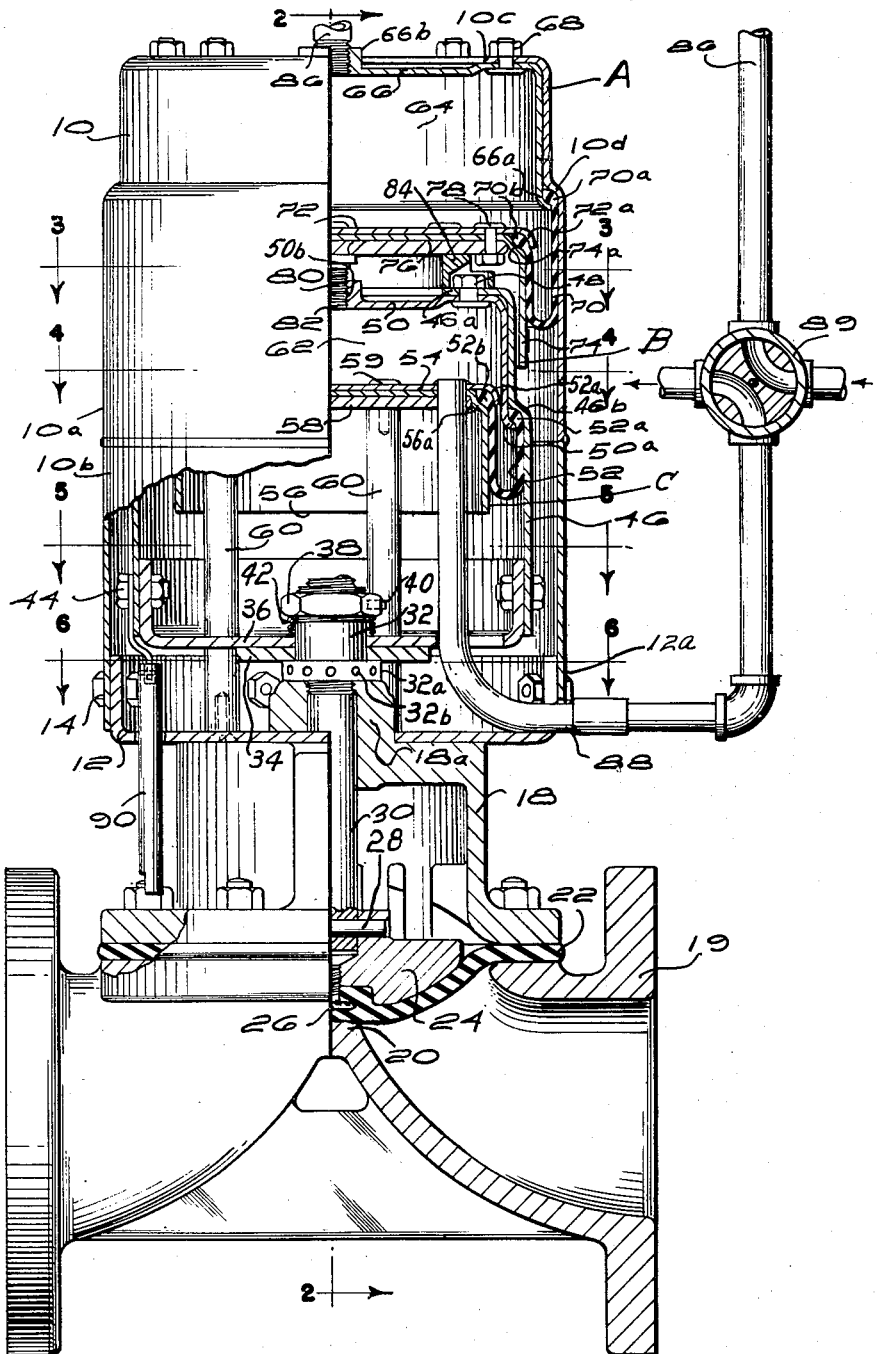

March 5, 1957 H. W. BOTELER 2,783,746
DOUBLE ACTING FLUID PRESSURE ACTUATOR
Filed June 10, 1950 3 Sheets-Sheet 3
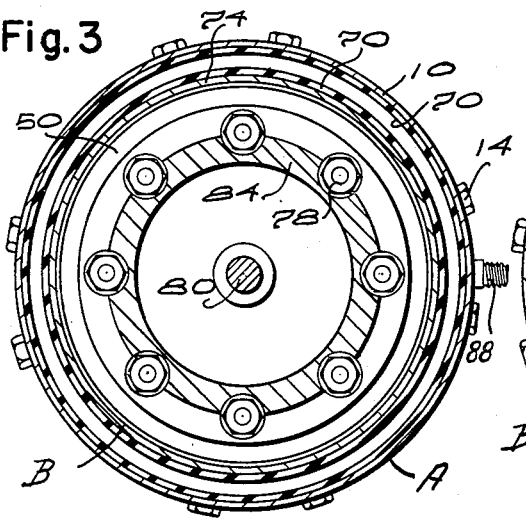
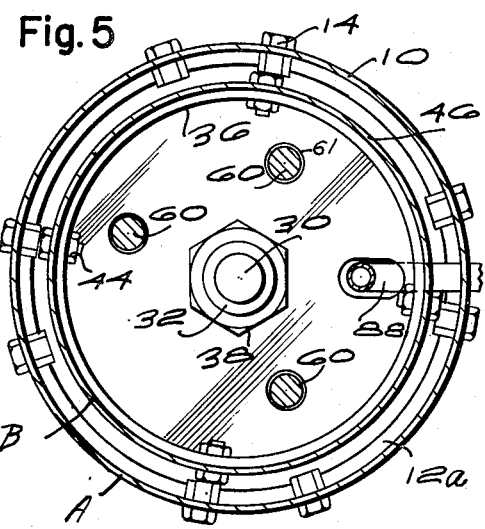
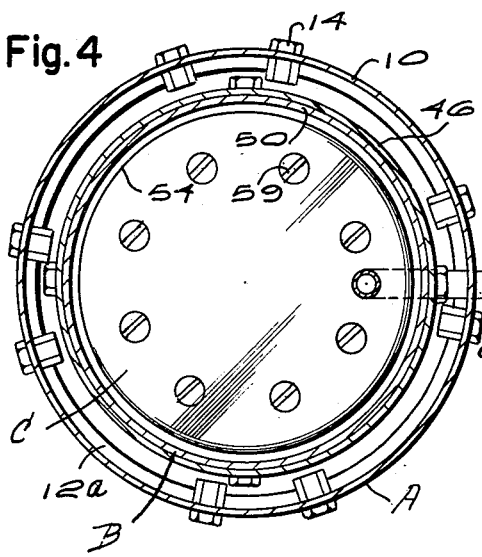
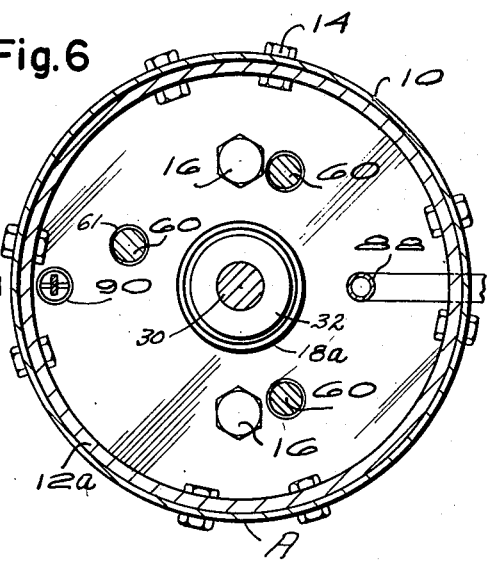
*INVENTOR.*
Henry W. Boteler
BY
ATTORNEY

2,783,746

DOUBLE ACTING FLUID PRESSURE ACTUATOR

Henry W. Boteler, East Greenwich, R. I., assignor to Grinnell Corporation, Providence, R. I., a corporation of Delaware Application June 10, 1950, Serial No. 167,336

1 Claim. (Cl. 121—48)

This invention relates to improvements in double acting fluid pressure actuator. More especially it has to do with actuators of the type disclosed in the Fitch Patent No. 2,478,575 of August 9, 1949.

The actuator of the Fitch patent has many desirable characteristics. It has an over-all diametrical dimension only a little larger than the diameter of the area on which the fluid pressure is effective. It has no packing glands or stuffing boxes to prevent the leakage of pressure around its moving parts, hence it can be operated with minimum friction loss. It is compact, easy to assemble and disassemble, and is highly efficient. However, the actuator of the Fitch patent is moved in only one direction by the application of fluid force and requires spring means to move it in the reverse direction.

It is an object of the present invention to provide an actuator having the aforesaid desirable characteristics and in addition having the feature of being moved in both directions of its travel by fluid pressure alone. This eliminates the spring means, enables the speed at which the moving parts travel in either direction to be determined by the intensity of the pressures applied and, except for a somewhat greater length, retains the desired compactness and high ratio of effective area to the diametrical size of the device.

It is a further object of the invention to provide a double acting actuator which has only two diaphragms so arranged between the fixed and moving parts of the device that they not only seal off two separated pressure chambers but also eliminate any packing glands, stuffing boxes, or other sealing diaphragms.

It is also an object to connect the movable parts of the actuator directly with an element to be moved along the axis of the device through a substantial length of travel and to provide adjusting means for varying the length of travel as desired.

The best mode in which it has been contemplated applying the principles of my improvements is shown in the accompanying drawings but these are primarily illustrative because it is intended that the patent shall cover by suitable expression in the appended claim whatever features of patentable novelty reside in the invention disclosed.

Figure 2:
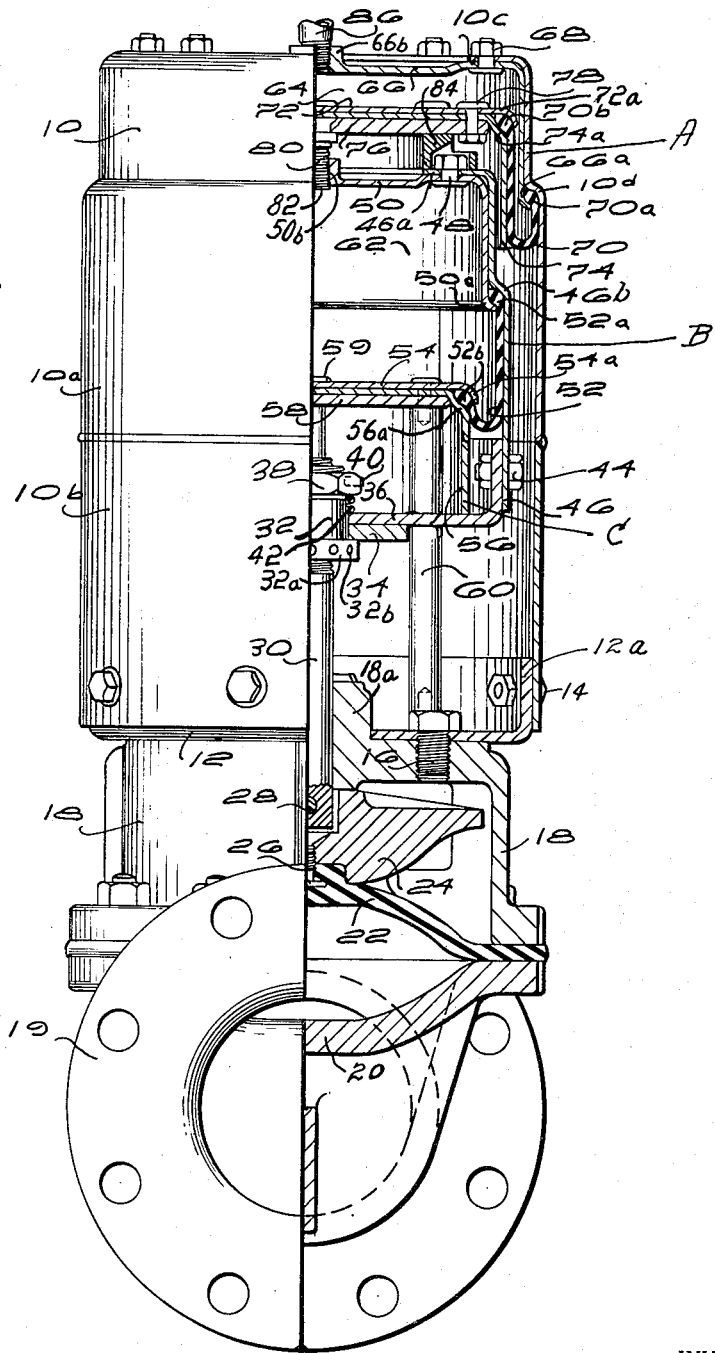

In the drawings:

Fig. 1 is an elevation partly in medial section of an actuator embodying my improvements, and showing it applied to a diaphragm valve with the latter in closed position;

Fig. 2 is a similar elevation, taken as on line 2—2 of Fig. 1, but with the valve shown open; and Figs. 3, 4, 5 and 6 are cross-sectional views taken as on lines 3—3, 4—4, 5—5, and 6—6 respectively of Fig. 1, but without showing of the diaphragm valve below.

Referring now more particularly to the drawings, the improved actuator has an outer cylinder unit A comprising a casing 10 which may be formed in one piece or made up from a top section 10a and a lower section 10b welded to the top section. The latter has an annular flange 10c at the top and a generally cylindrical side wall with a reversely curved portion 10d whose purpose will later appear. A flanged bottom plate 12 is suitably secured to the lower end of the casing 10, preferably by bolts 14. As here shown this bottom plate 12 is attached by bolts 16 to the bonnet 18 of the casing of a diaphragm valve 19 such as is shown in Letters Patent No. 2,412,105 of December 3, 1946. This valve, however, is primarily illustrative of any device having parts which it is desired to be moved by an actuator.

Specifically, the valve here shown is a "Grinnell-Saunders Diaphragm Valve" which has a weir-like seat 20 against which a diaphragm 22 can be seated to close the valve. The diaphragm is secured to a backing member or compressor 24 by an embedded threaded stud 26 and the backing member is in turn pivotally connected by a pin 28 to a valve stem 30. The latter extends upward through the bonnet of the valve and is attached to the moving parts of the actuator.

Threaded onto the upper end of the stem 30 is a sleeve nut 32 having a cylindrical head 32a provided with radial socket holes 32b. This head bears against a reinforcing plate 34 which in turn rests against a flanged bottom plate 36 of a sort of combined piston-cylinder unit B. The sleeve nut 32 also has external threads on which another nut 38 is screwed, to be locked in place by a set screw 40. Between the nut 38 and the bottom plate 36 a spring 42 is coiled about the sleeve nut 32. The friction provided by this compressed spring is sufficient to prevent the sleeve nut from inadvertently turning on the stem after it has been adjusted in position. This adjustment is accomplished by inserting the end of a rod (not shown) in one of a series of holes 32b in the head of the sleeve. Rotation of the sleeve nut in this manner determines the downward travel of the valve stem 30, and thus insures the proper seating of the diaphragm 22 on the weir-like seat 20 of the valve.

It will be noted that with the arrangement shown spring 42 is initially compressed when fluid pressure is admitted to the device to open the valve, and the valve diaphragm 22 will not be withdrawn from its seat on the weir 20 until the force exerted by this spring, thus compressed, exceeds the friction and inertia forces which are acting to maintain the valve diaphragm 22 on its seat, or until the spring 42 is compressed to its solid height. In either event, however, the movement achieved by the reinforcing plate 34 and bottom plate 36 before the spindle 30 begins to move is very slight and has not been found to be objectionable in any way.

The inner bottom plate 36 is attached by bolts 44 to the cylindrical wall of a movable inner casing 46 which is similar to the fixed outer casing 10 except that it is of smaller size. To the annular flange 46a at the top of this inner casing 46 is secured by bolts 48 an annular seal cup 50, the outer rim 50a of which is turned outward to form an annular pocket in conjunction with a reversely curved portion 46b of the side wall of the inner casing 46. In this annular pocket is clamped a circular bead 52a provided at one edge of a flexible sleeve diaphragm 52 which extends downward from the bead 52a, turns on itself and then extends upward to another circular bead 52b at its other edge. This other bead 52b is clamped between the curved edge 54a of a plate 54 and a reversely curved portion 56a of another seal cup 56 against whose depending side wall a portion of the diaphragm 52 can rest. The plate 54 and the top of the seal cup 56, together with a reinforcing plate 58 are secured by screws 59 to the upper ends of posts 60 which extend downward through clearance holes 61 (see Figures 5 and 6) in the plate 36 and have their lower ends fastened to the base plate 12 of the outer casing. This assembly of parts constitutes, as will presently appear, a fixed piston unit C within the aforesaid combined piston-cylinder unit B. Thus there is formed within the actuator a pressure chamber 62, defined by the fixed plate 54, the diaphragm 52 and the seal cup 50.

A similar chamber 64 is formed at the upper end of the outer cylinder unit A. Another annular seal cup 66, secured to the top annular flange 10c by bolts 68, has a depending skirt the lower edge 66a of which is curved outwardly to form another annular pocket in conjunction with the reversely curved portion 10d of the side wall of the outer casing. A circular bead 70a at one edge of a second and larger sleeve diaphragm 70 is clamped within this pocket from which the diaphragm 70 extends downward, turns on itself and then extends upward to where a circular bead 70b at its other end is clamped between the curved edge 72a of a plate 72 and a reversely curved portion 74a of still another seal cup 74 against whose depending skirt a portion of the diaphragm 70 may rest. The plate 72, the seal cup 74 and a reinforcing plate 76 are secured together by bolts 78 and are also connected to the top plate of the seal cup 50 of the inner piston-cylinder unit.

This last mentioned connection is made by a double-shank stud 80, one shank of which is passed through a central hole in the reinforcing plate 76 and then peened over to rivet this plate and the stud together. The other shank of the stud is threaded and screws part way into a threaded hole 50b at the center of the seal cup 50. The lower end of this threaded hole is sealed by a plug 82 which is screwed into the hole and then welded to the seal cup 50. A spacer ring 84 is clamped between the reinforcing plate 76 and the top flange of the inner casing 46 to limit the extent to which the two can be moved toward one another and thus prevent interference between the series of bolts 78 and 48.

Thus the actuator as a whole comprises the fixed outer cylinder unit, a fixed piston unit and a movable member called a piston-cylinder unit. These elements plus the flexible sleeve diaphragms provide the separate fluid pressure chambers on opposite sides of the movable member and enable the actuator to be moved in both directions by fluid pressure alone. There are no springs, except for the spring 42, and no packing glands or stuffing boxes employed and hence the friction loss is negligible. The concentric arrangement of the elements keeps the over-all diametrical dimensions small compared to the effective area acted upon by the fluid pressure. This effective area remains constant during the entire travel of the moving parts and its relatively large size obviates the need of excessively high fluid pressures.

Fluid pressure is admitted to and released from the chamber 64 through a pipe 86 screwed into a threaded hole of a hub 66b on the seal cup 66, and fluid pressure is admitted to and released from the chamber 62 through a pipe 88 which passes through the plate 58, seal cup 56, and plate 54 so to be fluid tight therewith. This pipe 88 extends down through a hole in the bottom plate 36 and curves outward to project through suitable open ended slots in the flange 12a of the bottom plate 12 and in the side wall of the outer casing 10. These pipes 86 and 88 can be separately connected to the same source of pressure supply in which case a valve 89 could be set in such manner that as the fluid pressure is admitted to one chamber (62 or 64) it is exhausted from the other chamber (64 or 62). By throttling means (not shown) suitably located in the pipe lines the rate of travel of the moving parts can be separately controlled if it is desired that the valve diaphragm 22 shall move toward or from its seat on the weir 20 at different speeds of travel.

As shown in Fig. 1 the fluid pressure may be assumed to be effective in chamber 64. It acts on the top side of the inner piston-cylinder unit holding the diaphragm 22 closed. To open the valve 19 the fluid pressure is let into chamber 62 through the pipe 88 while the pressure in chamber 64 is allowed to escape through the pipe 86. This will cause the moving parts to shift to the positions shown in Fig. 2. Since all the moving parts are entirely concealed by the outer casing of the actuator or the casing of the valve, an indicator rod 90 is attached to the inner casing 46 and extended through a hole in the bottom plate 12. The visible position of this rod indicates the position of the enclosed moving parts.

Although the improved actuator is illustrated in its application to a diaphragm valve it is to be understood that its use is not so limited. The outer casing 10 can be secured to any fixed element and the inner bottom plate 36 connected by suitable means to whatever is desired to be moved by the actuator. The movement of the latter can then be controlled solely by the proper application of the fluid pressure within the two pressure chambers of the actuator.

I claim:

A double acting fluid pressure actuator comprising a fixed outer cylinder unit having a bottom plate; a fixed piston unit concentrically arranged within and spaced from said outer cylinder unit being supported on the said bottom plate; a movable pressure actuated piston-cylinder unit interposed between the said outer cylinder unit and said fixed piston unit having a depending side wall and a plate across the bottom thereof; a flexible sleeve diaphragm connecting the upper end of said piston-cylinder unit with the outer cylinder unit to form a pressure chamber above the head of said piston-cylinder unit; a second flexible sleeve diaphragm connecting the upper end of said fixed piston unit to said piston-cylinder unit to form a pressure chamber below the head of said piston-cylinder unit; a rod adjustably connected to the said plate across the bottom of the said piston-cylinder unit and movable with said piston-cylinder unit along the axis of the actuator; and a bushing rotatably mounted at the center of the said plate across the bottom of the said piston-cylinder unit, said bushing being in threaded engagement with the upper end of said rod, whereby rotation of said bushing changes the axial position of said rod with respect to said piston-cylinder unit.

References Cited in the file of this patent

UNITED STATES PATENTS

| 368,089 | Hinds | Aug. 9, 1887 |
| 549,800 | Lipkowski | Nov. 12, 1895 |
| 1,414,835 | Spohrer | May 2, 1922 |
| 1,751,277 | Karibo et al. | Mar. 18, 1930 |
| 1,871,044 | Crosthwait et al. | Aug. 9, 1932 |
| 2,347,837 | Morrison | May 2, 1944 |
| 2,437,552 | Quiroz | Mar. 9, 1948 |
| 2,527,814 | Hanssen | Oct. 31, 1950 |
| 2,574,574 | Ives | Nov. 13, 1951 |
| 2,730,995 | Seeloff et al. | Jan. 17, 1956 |
| 2,731,534 | Hansen et al. | Jan. 17, 1956 |

FOREIGN PATENTS

| 3,058 | Great Britain | 1884 |